United States Patent
Yan et al.

(10) Patent No.: US 7,769,854 B2
(45) Date of Patent: Aug. 3, 2010

(54) BANDWIDTH CONSTRAINT CONSTRUCTION FOR OVERLAPPED LOGICAL CHANNELS

(75) Inventors: Anlu Yan, Acton, MA (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 227 days.

(21) Appl. No.: 11/943,016

(22) Filed: Nov. 20, 2007

(65) Prior Publication Data

US 2009/0132694 A1 May 21, 2009

(51) Int. Cl.
*G06F 15/173* (2006.01)
(52) U.S. Cl. .................. 709/224; 709/225; 709/226; 709/238; 709/239
(58) Field of Classification Search ......... 709/223–226; 370/232
See application file for complete search history.

(56) References Cited

U.S. PATENT DOCUMENTS

| | | | |
|---|---|---|---|
| 5,864,542 A | 1/1999 | Gupta et al. | |
| 6,292,495 B1 | 9/2001 | Von Hammerstein et al. | |
| 6,321,271 B1 * | 11/2001 | Kodialam et al. | 709/241 |
| 6,584,108 B1 | 6/2003 | Chung et al. | |
| 6,778,495 B1 | 8/2004 | Blair | |
| 6,895,440 B1 | 5/2005 | Lui | |
| 7,382,727 B2 * | 6/2008 | Yang | 370/232 |
| 7,409,459 B2 * | 8/2008 | Bejerano et al. | 709/239 |
| 2003/0120780 A1 * | 6/2003 | Zhu et al. | 709/226 |
| 2005/0010571 A1 * | 1/2005 | Solotorevsky et al. | 707/5 |
| 2005/0091350 A1 * | 4/2005 | Bejerano et al. | 709/223 |
| 2005/0141385 A1 * | 6/2005 | Yamakawa et al. | 369/59.22 |
| 2005/0286559 A1 | 12/2005 | Miernik et al. | |
| 2006/0036762 A1 * | 2/2006 | Vadlakonda et al. | 709/238 |
| 2006/0200251 A1 * | 9/2006 | Gu et al. | 700/1 |
| 2006/0218301 A1 | 9/2006 | O'Toole et al. | |
| 2006/0242123 A1 | 10/2006 | Williams | |
| 2006/0251419 A1 | 11/2006 | Zadikian et al. | |
| 2007/0091811 A1 * | 4/2007 | Thubert et al. | 370/238 |
| 2008/0250135 A1 * | 10/2008 | Pradhan et al. | 709/224 |

* cited by examiner

*Primary Examiner*—Ashok B Patel
*Assistant Examiner*—Linglan Edwards
(74) *Attorney, Agent, or Firm*—Cesari and McKenna, LLP

(57) ABSTRACT

A technique determines whether configured logical bandwidth allotments for logical channels are supported by maximum available physical bandwidths of physical channels assigned to those logical channels. The technique establishes a bandwidth-constraint directed acyclic graph (DAG) or "BCD" based on novel relationship rules between vertexes of the BCD that represent logical channels or unions of logical channels as well as the underlying physical channels and their maximum available bandwidth constraints. Once the BCD is established, the vertexes of the BCD may be traversed (e.g., from in-neighbor vertexes to out-neighbor vertexes) to determine whether their constraints are met.

25 Claims, 6 Drawing Sheets

BANDWIDTH CONSTRAINT CONSTRUCTION FOR OVERLAPPED LOGICAL CHANNELS

TECHNICAL FIELD

The present disclosure relates generally to computer networks, and, more particularly, to determining bandwidth constraints of overlapped logical channels on physical channels of the computer networks.

BACKGROUND

In communication systems, logical channels may be defined as being disposed over physical channels so that each logical channel may contain one or more physical channels and each physical channel may be shared by one or more logical channels. Bandwidth assignment to the logical channels ("allotment") is thus constrained by the underlying physical channel capacity. While such constraints may be easy to formulate in some special cases (e.g., simplistic configurations), the constraints may be rather complicated to construct in general.

For instance, a "brute force" method to check all of the possible constraints would iterate on all possible combinations of either the logical channels or the physical channels. Thus, the complexity would be on the order of the number of either logical or physical channels, respectively. As those skilled in the art may appreciate, as the number of logical and/or physical channels increase, this complexity becomes burdensome and difficult to manage (and most of such possible combinations would be invalid). There remains a need, therefore, to construct these constraints correctly and efficiently to determine whether logical bandwidth allotments are supported by underlying physical channels.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
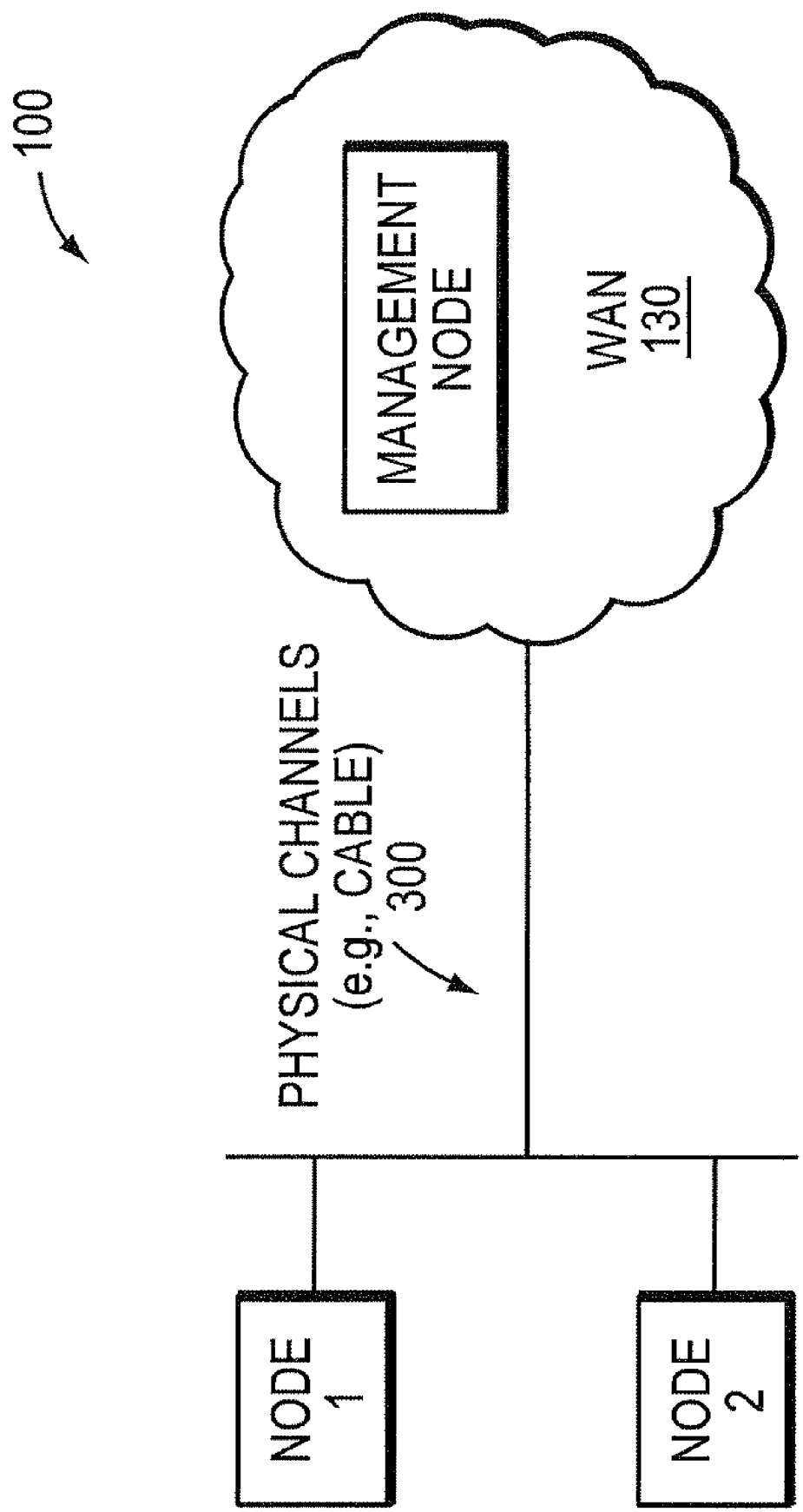
FIG. 1 illustrates an example computer network.

According to embodiments of the disclosure, a technique determines whether configured logical bandwidth allotments for logical channels are supported by maximum available physical bandwidths of physical channels assigned to those logical channels. The technique establishes a bandwidth-constraint directed acyclic graph (DAG) or "BCD" based on novel relationship rules between vertexes of the BCD that represent logical channels or unions of logical channels as well as the underlying physical channels and their maximum available bandwidth constraints. Once the BCD is established, the vertexes of the BCD may be traversed (e.g., from in-neighbor vertexes to out-neighbor vertexes) to determine whether their constraints are met.

In particular, according to one or more embodiments of the disclosure, the novel relationship rules may comprise: i) each vertex of the BCD represents one of either a logical channel or a union of a plurality of logical channels or both; ii) an out-neighbor of any vertex is a proper superset of that vertex, the proper superset having additional physical channels to those represented by the logical channels of that vertex; iii) an in-neighbor of any vertex is a proper subset of that vertex, the proper subset having fewer physical channels to those represented by the logical channels of that vertex; iv) if a first logical channel or union of logical channels intersects with a second logical channel or union of logical channels, a union of the first and second logical channels is represented as a vertex in the BCD; v) if a third logical channel or union of logical channels shares an identical set of physical channels with a fourth logical channel or union of logical channels, the third and fourth logical channels are represented as a single vertex in the BCD; and vi) each vertex represents a constraint that a sum of minimum logical bandwidth allotments of logical channels of the vertex is less than or equal to a sum of maximum allowable physical bandwidths of physical channels of the logical channels of the vertex.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, coaxial cable, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains.

FIG. 1 is a schematic block diagram of an example computer network 100 illustratively comprising nodes/devices, such as one or more nodes (e.g., nodes 1 and 2) interconnected with WAN 130 links (physical channels 300) as shown (e.g., a LAN). Illustratively, a management node may be located within the WAN 130 in accordance with one or more embodiments described herein. Illustratively, the cables (with physical channels 300) may terminate in the WAN 130 at a cable modem termination system (CMTS) (e.g., part of or in communication with the management node). Those skilled in the art will understand that any number of nodes, devices, links, etc. may be used in the computer network, and that the view shown herein is for simplicity.

Data packets (e.g., traffic sent over physical channels 300) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, etc.

As will be understood by those skilled in the art, DOCSIS (Data-Over-Cable Service Interface Specifications) is an international standard that defines communications and operation support interface requirements for a data-over-cable system (e.g., DOCSIS 3.0 of August 2006). According to DOCSIS, a physical cable, which has a limited available bandwidth, may be divided into physical "channels" based on 6 MHz wide frequencies (notably, 8 MHz wide in Europe, for EuroDOCSIS). Cable modems or other devices (e.g., of nodes 1 and 2) may use tuners to "lock on" or "tune to" one or more of the frequencies to transfer (transmit/receive) data over the physical channel corresponding to that frequency. In other words, a physical channel is a particular transmission frequency on a communication medium, such as a 6 MHz wide "pipe" on a cable. Each physical channel of a cable may have an equal or different bandwidth, e.g., depending upon which quadrature amplitude modulation (QAM) scheme (QAM-64, QAM-256, etc.) is utilized on the channel(s). For example, the bandwidth of a QAM-256 channel (a physical channel) that is 6 MHz wide provides a 39.4 MB/sec data rate (a physical maximum available bandwidth), as will be appreciated by those skilled in the art.

Figure 2:
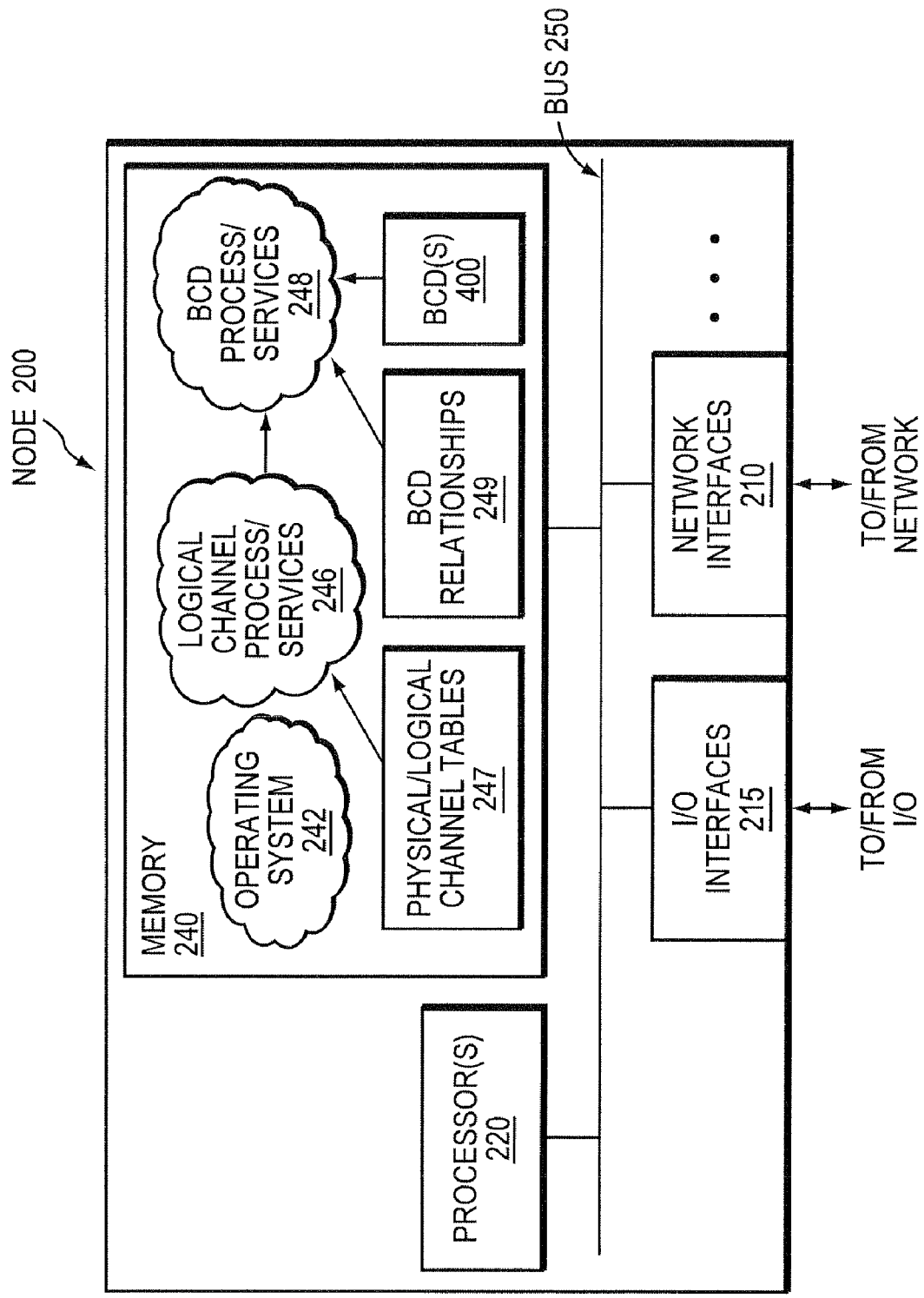
FIG. 2 illustrates an example network device/node.

FIG. 2 is a schematic block diagram of an example node/device 200 that may be advantageously used with one or more embodiments described herein, e.g., as a management node (or node 1 and/or 2). The device comprises a plurality of network interfaces 210, one or more Input/Output (I/O) interfaces 215, one or more processors 220, and a memory 240 interconnected by a system bus 250. The I/O interfaces 215 contain the mechanical, electrical, and signaling circuitry for communicating with input and output devices, such as keyboards, mice, monitors, speakers, etc. The network interfaces 210 (which may be considered to be I/O interfaces) contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), DOCSIS, etc. For example, network interfaces 210 may comprise one or more tuners to access particular physical channels as mentioned above.

The memory 240 comprises a plurality of storage locations that are addressable by the processor(s) 220 and the network interfaces 210 for storing software programs and data structures associated with the embodiments described herein. The processor(s) 220 may comprise necessary elements or logic adapted to execute the software programs and manipulate the data structures, such as physical/logical channel tables 247, BCD relationships 249, and BCDs 400, as described in more detail herein. An operating system 242, portions of which are typically resident in memory 240 and executed by the processor(s), functionally organizes the node by, inter alia, invoking operations in support of software processes and/or services executing on the device. These software processes (programs/software) and/or services may comprise an illustrative logical channel process/services 246 and an illustrative BCD process/services 248, as described in accordance with one or more embodiments herein. It will be apparent to those skilled in the art that other processor and memory means, including various computer-readable media, may be used to store and execute program instructions pertaining to the inventive technique described herein.

Figure 3:
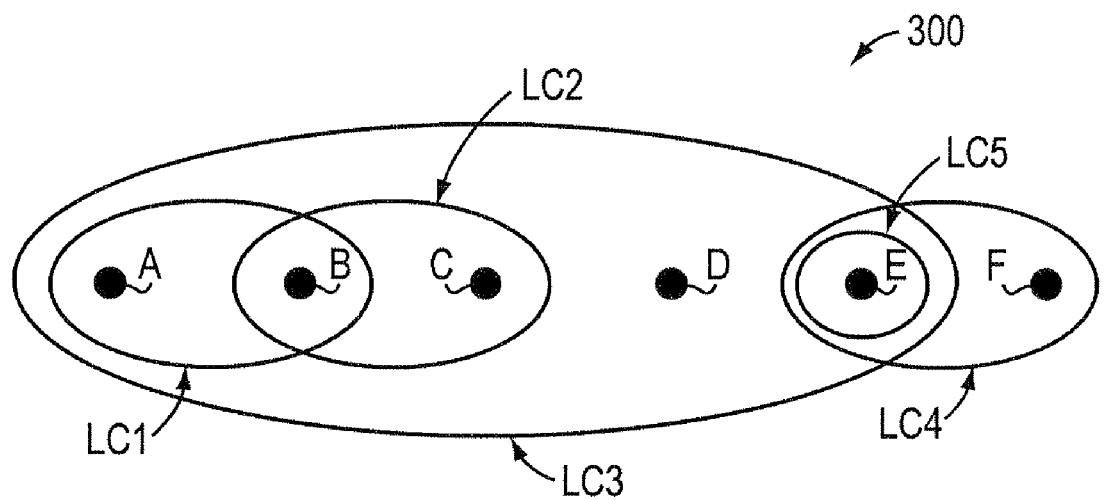
FIG. 3 illustrates an example representation of logical and physical channels.

In particular, logical channel process/services 246 (e.g., of the management node) contain computer executable instructions executed by each processor 220 to perform functions relating to logical channels. Generally, one or more physical channels may be assigned to a logical channel, i.e., allowing physical channels to be bundled together (channel bonding) into "bonding groups" (or non-bonded channels, as will be appreciated by those skilled in the art). FIG. 3 illustrates an example representative view 300 of one or more physical channels 310 bonded into logical channels 320. For instance, example logical channels (320) "LC1-LC5" may overlap underlying physical channels (310) A-F, as shown. Five different logical channel associations are possible, such as subset (e.g., LC5 to LC4), superset (e.g., LC4 to LC5), identical (e.g., assume two LC1s), intersecting (e.g., LC1 and LC2), and disjoint (e.g., LC2 and LC4). Note that while the logical channels are shown as grouping/bonding adjacent physical channels, those skilled in the art will appreciate that logical channels may be any combination of physical channels, and that the view shown herein is for simplicity. Also, while it may be implied that logical channels share physical channels of a single physical cable (e.g., different frequencies on a cable), it may be possible to have logical channels that bond physical channels of different/separate physical communication media (cables, wires, wireless, etc.).

To provide for quality of service (QoS), each of the logical channels may be configured with a logical bandwidth allotment. For instance, the maximum available physical bandwidth for a logical channel is the sum of the underlying physical channel bandwidths (denoted as "Q", e.g., 50 Mbps), such that if a logical channel (e.g., LC1) bonds two physical channels, the maximum bandwidth available for that logical channel is the sum of the two physical channel bandwidths (A and B), or "2Q" (e.g., 100 Mbps). However, because logical channels may overlap (e.g., LC1 shares physical channels A and B with LC3, and channel B also with LC2), the bandwidth constraint for LC1 is directly related to the constraints of LC2 and LC3 (which, notably, may be related to other logical channel constraints as well). Accordingly, the logical bandwidth allotment may be configured as a value that is "guaranteed" to be available to the logical channel (e.g., 5 Mbps). Notably, the logical bandwidth allotment may represent a minimum logical bandwidth allotment, such as based on a committed information rate (CIR) for the respective logical channel (e.g., 5 Mbps). Alternatively, the logical bandwidth allotment may be an actual usage of bandwidth on the logical channels, such as based on load-balancing bandwidth between logical channels (e.g., sharing of available bandwidth between overlapping logical channels, for example, up to 100 Mbps). In particular, for load-balancing, such allotment may be adjusted dynamically to achieve balanced traffic load among overlapping physical channels, accordingly.

Typically, a network administrator may utilize logical channel process/services 246 to manually configure logical channels with assigned physical channels and logical bandwidth allotments. However, it is expressly contemplated that logical channel process/services 246 may configure logical channels dynamically (e.g., in response to network events, commands, other triggers, etc.). In either event, the association of physical channels and logical channels, as well as other related information, such as available and/or allotted bandwidths, may be stored in physical/logical channel tables 247 (or other database storage means, e.g., lists), accordingly.

Since service flows are generally associated with logical channels, the service flows are illustratively scheduled based on the bandwidth available for the logical groups to which they belong (that is, overlapping logical channels). While logical channel bandwidth may be statically or dynamically allocated, it is subject to the constraints imposed by the underlying physical channel bandwidth. For example, according to the example in FIG. 3, and assuming that each physical channel has the same bandwidth or QAM of "Q", the following constraints are satisfied by the logical bandwidth allotments:

1. LC1<=2Q (or A+B);
2. LC2<=2Q (or B+C);
3. LC1+LC2<=3Q (or A+B+C);
4. LC5<=Q (or E);
5. LC4<=2Q (or E+F);
6. LC4+LC5<=2Q (or E+F);
7. LC3<=5Q (or A+B+C+D+E);
8. LC1+LC2+LC3+LC5<=5Q (or A+B+C+D+E); and
9. LC1+LC2+LC3+LC4+LC5<=6Q (or A+B+C+D+E+F).

As noted, while bandwidth constraints for the logical channels may be easy to formulate in some special cases (e.g., simplistic configurations), the constraints may be rather complicated to construct in general. Brute force methods to check all of the possible constraints would be inconveniently complex, particularly for a large number of logical and/or physical channels. For instance, changing the bandwidth allotment for LC1 in the simple example above would require a check of at least constraints 1, 3, 8, and 9 above. Conversely, changing the physical bandwidth of physical channel E would require a check of at least constraints 4-9. As those skilled in the art will appreciate, these checks become increasingly more complex and difficult to manage as the number of channels (logical and/or physical) increase. There remains a need, therefore, to construct these constraints correctly and efficiently, and to determine whether logical bandwidth allotments are supported by underlying physical channels.

Bandwidth Constraint Construction

According to embodiments of the disclosure, a technique determines whether configured logical bandwidth allotments for logical channels are supported by maximum available physical bandwidths of physical channels assigned to those logical channels. The technique establishes a bandwidth-constraint directed acyclic graph (DAG) or "BCD" based on novel relationship rules between vertexes of the BCD that represent logical channels or unions of logical channels as well as the underlying physical channels and their maximum available bandwidth constraints. Once the BCD is established, the vertexes of the BCD may be traversed (e.g., from in-neighbor vertexes to out-neighbor vertexes) to determine whether their constraints are met.

In an illustrative embodiment, BCD process 248 (in cooperation with logical channel process 246) when executed may operate to perform functions relating to the novel techniques described herein. In particular, BCD process 248 may be utilized to determine whether configured logical bandwidth allotments for one or more logical channels are supported by maximum available physical bandwidths of one or more underlying physical channels assigned to those logical channels.

Figure 4:
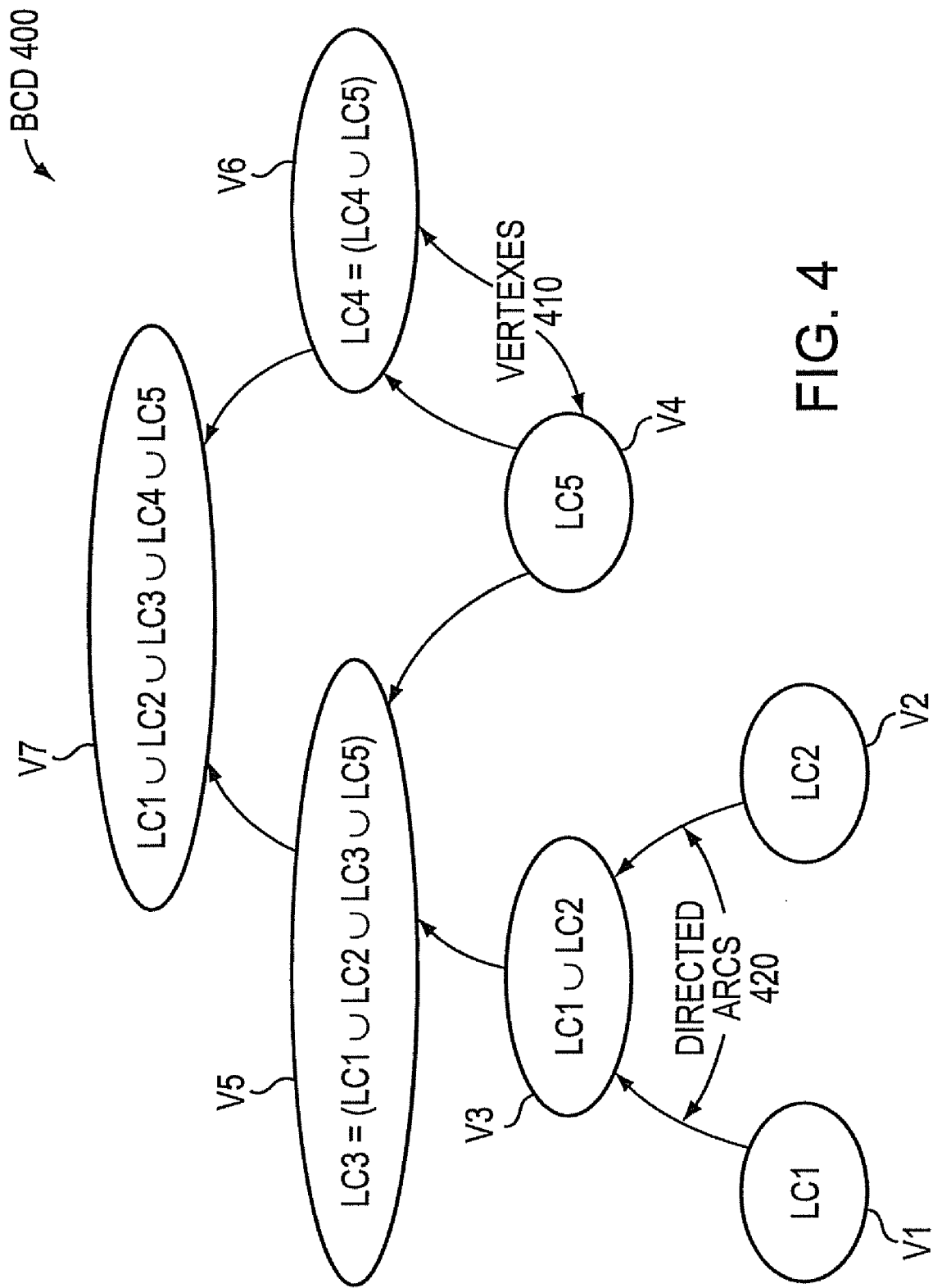
FIG. 4 illustrates an example Bandwidth Constraint DAG (BCD)

Operationally, BCD process 248 may establish a BCD based on associations between overlapping logical channels 320 and their underlying physical channels 310 (e.g., whose associations are illustratively stored in physical/logical channel tables 247). FIG. 4 illustrates an example BCD 400, e.g., based on the logical channels 320 and physical channel 310 of FIG. 3 above, and in accordance with BCD relationships described herein. In particular, "vertexes" 410 ("V1-V7") of the BCD 400 are represented as nodes of a DAG, as will be appreciated by those skilled in the art. In that sense, directed arcs 420 are shown interconnecting neighboring/adjacent vertexes of the BCD. Specifically, if a directed arc 420 leaves a first vertex (e.g., V1) and enters a second vertex (e.g., V3), then the first vertex (V1) is an "in-neighbor" of the second vertex (V3), and the second vertex (V3) is an "out-neighbor" of the first vertex (V1). (Note also that a "U" in a vertex 410 represents a "union" of logical channels, as described herein.)

According to one or more embodiments described herein, a set of relationships (e.g., rules for establishing the BCD as described herein and stored as BCD relationships 249) between the vertexes of the BCD may be configured such that a correct and efficient BCD 400 may be appropriately established. Illustratively, relationships (i) through (vi) as described in detail below may be used to establish the BCD 400.

(i) Each vertex 410 of the BCD 400 represents one of either a logical channel or a union of a plurality of logical channels or both. For example, as determined by other relationships described herein, vertex V1 represents logical channel LC1, while vertex V3 represents a union of LC1 and LC2. Also, vertex V5 may represent both LC3 and a union of LC1, LC2, LC3, and LC5.

(ii) An out-neighbor of any vertex 410 is a proper superset of that vertex. In particular, a proper superset is a set of logical channels that has additional physical channels to those represented by the logical channels of that vertex 410. For instance, vertex V4 represents logical channel LC5, which has underlying physical channel E. LC4, on the other hand, has underlying physical channels E and F, and is thus a superset of physical channel E for LC5. Therefore, vertex V4 representing LC5 has an out-neighbor vertex V6 representing the superset created by the union of logical channels LC4 and LC5.

(iii) A converse of relationship (ii) is that an in-neighbor of any vertex 410 is a proper subset of that vertex, where the proper subset has fewer physical channels to those represented by the logical channels of that vertex 410. In other words, V4 is an in-neighbor of V6 because V4 represents a subset of the physical channels that are represented by vertex V6.

(iv) If one logical channel or union of logical channels intersects with another logical channel or union of logical channels, a union of the first and second logical channels is represented as a vertex 410 in the BCD 400. For example, logical channel LC1 (V1) has underlying physical channels A and B, while logical channel LC2 (V2) has underlying physical channels B and C. Since one logical channel (LC1) and the other logical channel (LC2) share at least one physical channel (B) and do not share at least one other physical channel (A or C), then LC1 and LC2 have a vertex 410 representing their union (e.g., V3). Note also that because V3 represents physical channels A, B, and C, V3 is a superset to both V1 and V2, thus are configured as shown according to relationships (ii) or (iii) above.

(v) If one logical channel or union of logical channels shares an identical set of physical channels with another logical channel or union of logical channels, those logical channels are represented as a single vertex in the BCD. For instance, logical channel LC3 has underlying physical channels A-E, as does the union of logical channels LC1, LC2, LC3 (itself), and LC5. Accordingly, LC3 and the union of LC1, LC2, LC3, and LC5 are represented as a single vertex V5 in the BCD 400 (LC3=LC1 U LC2 U LC3 U LC5).

(vi) Each vertex 410 represents a constraint that a sum of logical bandwidth allotments of logical channels of the vertex is less than or equal to a sum of maximum allowable physical bandwidths of physical channels of the logical channels of the vertex. In other words, each vertex represents the constraints of the overlapping logical channels and underlying physical channels, such as constraints 1-9 above. For example, vertex V1 represents logical channel LC1, which, according to relationship (vi) indicates that the logical bandwidth allotment for LC1 is less than or equal to the maximum allowable bandwidth of underlying physical channels A and B (or, constraint 1: $LC1<=2Q$). Similarly, each of the other vertexes 410 represents each of the other constraints (2-9), e.g., V3 represents the union of LC1 and LC2, thus $LC1+LC2<=3Q$ (or A+B+C). Note that vertex V5 represents both LC3 and the union of LC1, LC2, LC3, and LC5, and thus represents the union of constraints 7 and 8, namely that LC3 and the union of (LC1+LC2+LC3+LC5) are less than or equal to 5Q, for underlying physical channels A-E.

Based on the relationships (i) through (vi) above (e.g., stored as BCD relationships 249), BCD process 248 may establish the BCD 400 based additionally on physical/logical tables 247 by applying the relationships to the associations, accordingly. Notably, while constraints 1-9 above are determined prior to establishment of the BCD in the representative example, those skilled in the art will appreciate that with larger numbers of logical and/or physical channels, the constraints may be more difficult to construct without the BCD process 248 utilizing the relationships described above. (Note further, that in certain circumstances a logical channel or union of logical channels may not overlap with any logical channels of the BCD 400, i.e., are disjoint from all logical channels of the BCD 400. Accordingly, those disjoint logical channels may be included as a separate vertex 410 of the BCD 400 with no in/out-neighbors with the other logical channel vertexes, or represented as a separate BCD 400 of their own.)

Once the BCD 400 for a set of logical channels (LC1-LC5) is established, the vertexes 410 (e.g., V1-V7) of the BCD may be traversed (along directed arcs 420) to determine whether the constraints of the vertexes are met. In other words, "walking" the BCD may determine whether the logical bandwidth configurations meet or violate the bandwidth constraints of the underlying physical channels as shared by the overlapping logical channels. Traversal of a DAG, generally, may be well understood by those skilled in the art, for example, traversing the vertexes 410 of the BCD 400 from in-neighbor vertexes to out-neighbor vertexes (i.e., in the direction of the directed arc 420 arrows, typically starting at the base vertexes, e.g., V1, V2, and V5). In particular, the vertexes of the BCD may be traversed in a depth-first manner or a breadth-first manner, as will be appreciated by those skilled in the art. Illustratively, BCD process 248 may dynamically traverse the BCD 400, e.g., marking each vertex as visited, and returning a pass/fail (true/false) response for each vertex based on the represented constraints therein. For example, BCD process 248 may first determine at vertex V1 whether $LC1<=2Q$, then at vertex V2 whether $LC2<=2Q$, then at vertex V3 whether $LC1+LC2<=3Q$, etc. If any one of the vertexes/constraints is violated, the BCD process 248 may cease the traversal, or may continue to walk the BCD to determine if other constraints are also violated. In this manner, the traversal of the BCD 400 that was established in the manner described herein may determine whether configured logical bandwidth allotments for logical channels are supported by maximum available physical bandwidths of physical channels assigned to those logical channels (i.e., whether any constructed constraints are violated).

As a brief example, assume that physical channels A, B, and C each support a maximum available physical bandwidth of 50 Mbps; a total of 150 Mbps. Accordingly, either of LC1 and LC2 may have up to 100 Mbps (satisfying their respective constraints of V1 and V2 of up to 100 Mbps), however the combination/union of the two logical channels cannot exceed 150 Mbps. In addition, though, logical channels LC1 and LC2 share their physical channels with LC3, hence the out-neighbor from V3 of V5, which is also satisfied. The BCD 400 thus allows BCD process 248 to traverse each vertex in an efficient manner, determining whether the corresponding constraints are satisfied, to determine whether the allotted logical bandwidths for overlapping logical channels are supported by the underlying physical channels.

Also, in response to a change in a bandwidth value of the BCD (e.g., a logical bandwidth allotment or, less likely, an available physical bandwidth value), the vertexes 410 of the BCD 400 may be re-traversed to re-determine whether the constraints of the vertexes are met. In particular, to check a logical channel's bandwidth change, BCD process 248 need only traverse the vertexes 410 that are reachable from the starting vertex of that change. For example, assume that an administrator (or dynamic process) wishes to change the logical bandwidth allotment for LC5 (e.g., more or less). Accordingly, the starting vertex 410 for LC5 is V4, and each path toward the end out-neighbor may be traversed, e.g., from V4 to V5 to V7, and from V4 to V6 to V7 (or, notably, from V4 to V5 and V6 then to V7). As such, the bottom vertexes V1-V3 need not be traversed, as none of those vertexes are interested with the change in LC5's bandwidth (until, that is, their union in V5). Similarly, in the event a physical bandwidth changes (e.g., an upgraded cable is introduced), e.g., physical channel F's bandwidth, then the affected vertexes again may be traversed to ensure that no logical bandwidth allotments violate the underlying physical bandwidth (for instance, re-traversing vertexes V6 and V7). Notably, the BCD 400 is illustratively constructed such that it may be used to "prune" the search space aggressively, e.g., using conventional or novel traversal algorithms to retrieve the constraints for bandwidth assignment/allotment in an efficient manner, i.e., only traversing those vertexes as necessary to determine constraint violations.

Note, also, that the BCD process 248 may be configured to solve for logical bandwidth allotment values, such as determining a maximum value that may be allotted to a particular logical channel given the other logical channels of the BCD 400, such as by iteratively increasing the allotted bandwidth value and re-traversing the BCD until a failed/violated constraint is reached.

In addition, BCD process 248 may be configured to maintain the relationships between vertexes 410 of the BCD 400 upon creation and deletion of logical channels, accordingly. For instance, if a logical channel is added that overlaps the logical channels of BCD 400, or, conversely, a logical channel of the BCD 400 is removed, BCD process 400 may determine which vertexes 410 and directed arcs 420 need modification. Illustratively, when an update to the BCD is required by a creation/deletion of a logical channel, BCD process 248 may recursively update any vertexes that may be related. In other words, the BCD process 248 checks each logical channel for shared physical channels, and determines how to adjust the BCD 400 based on that relation. For example, assume that LC4 is removed/deleted. As such, vertex V6 ("LC4=(LC4 U LC5)") may be removed, and V4 need only have an out-neighbor of V5 since there is no longer any overlap between LC5 and LC4 (i.e., LC5 no longer has LC4 as a superset). The same applies for vertex V7, which is no longer needed as there is no intersection between LC4 (V6) and LC3 (V5). The updated BCD 400 (after deletion of LC4), then, would have only vertexes V1-V5. In a similar manner, should a logical channel be added (e.g., adding LC4 to the updated BCD 400, for simplicity), BCD process 248 determines relationships, and modifies the BCD accordingly (i.e., adding vertexes V6 and V7 based on the relationships 249 described above). Note that in an alternative embodiment, additions and/or removals of logical channels to/from the BCD 400 may result in a complete reestablishment of the BCD, but the same end-result BCD should occur.

Figure 5:
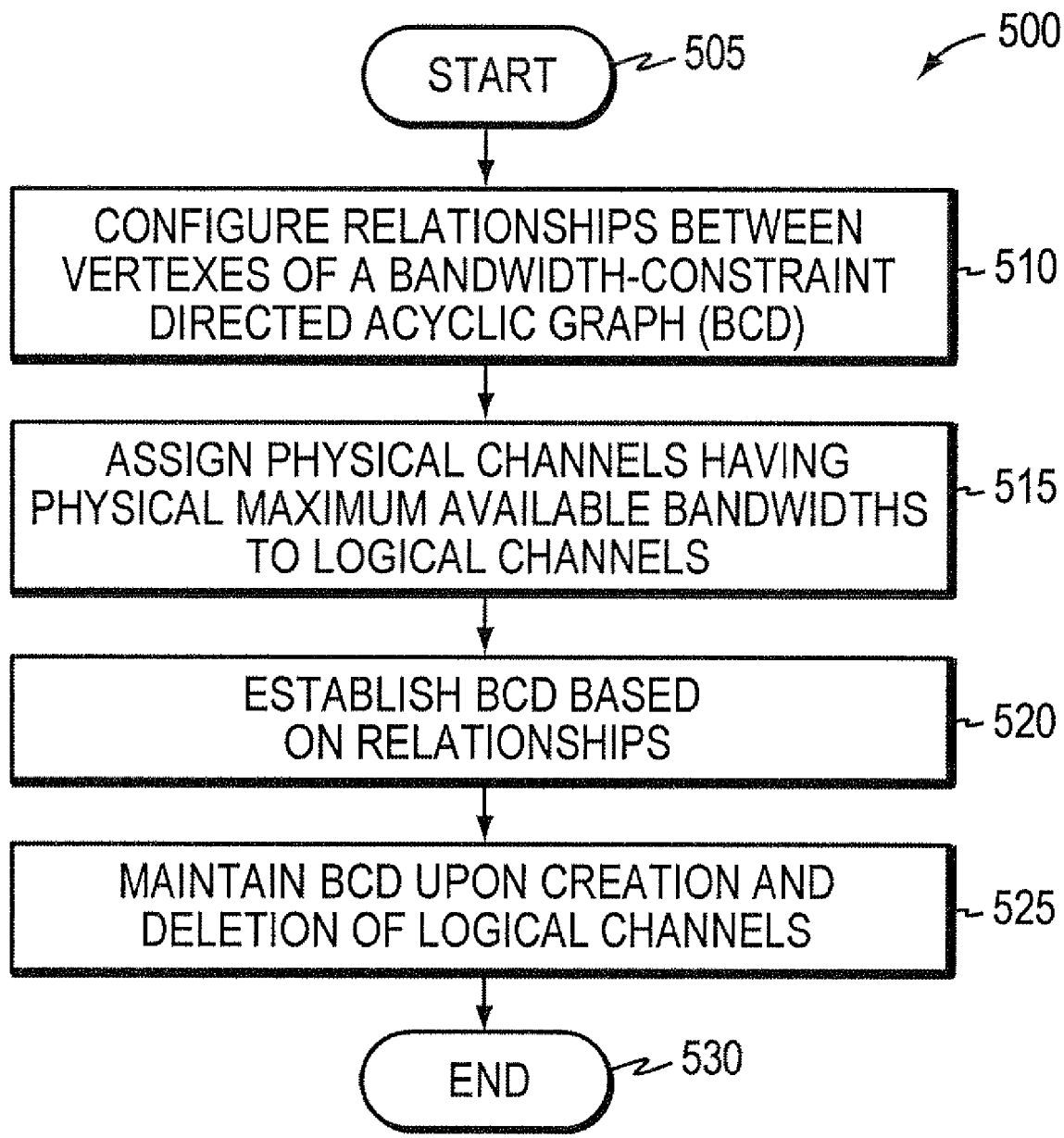
FIGS. 5-6 illustrate example procedures for determining whether logical bandwidth allotments are supported by underlying physical channels.
Figure 6:
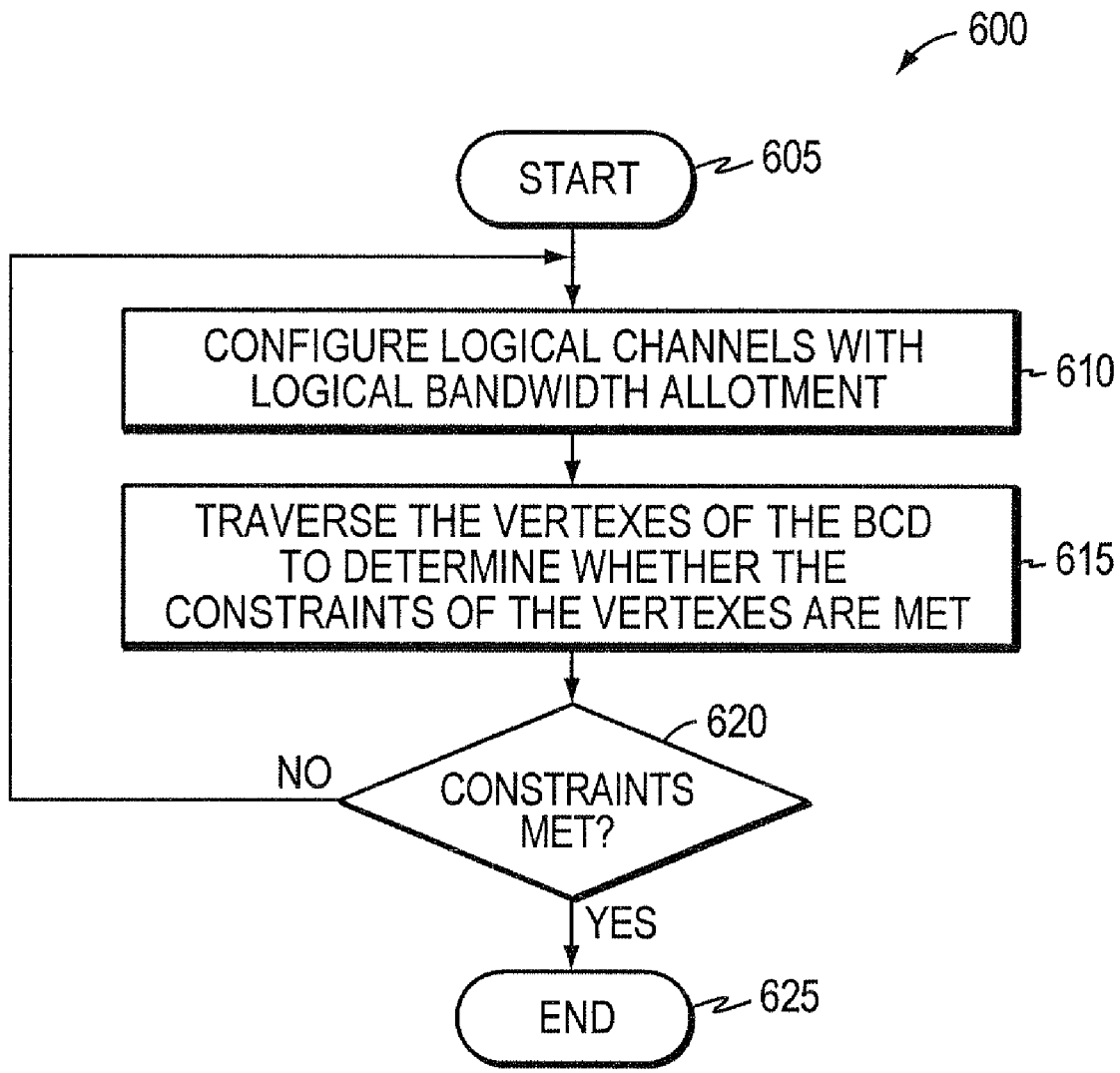

FIGS. 5-6 illustrate example procedures for determining whether logical bandwidth allotments are supported by underlying physical channels in accordance with one or more embodiments described herein. In particular, FIG. 5 illustrates an example procedure for constructing and maintaining a BCD 400. The procedure 500 starts at step 505, and continues to step 510, where relationships/rules between vertexes of a BCD have been configured that may be used when establishing the BCD, such as in accordance with the relationships (i)-(vi) described in detail above (e.g., BCD relationships 249). (Notably, step 510 may have generally occurred upon creation of BCD process 248 by developers/designers, as will be appreciated by those skilled in the art.) In step 515, physical channels 310 (e.g., A-F) having maximum available physical bandwidths are assigned to logical channels 320 (e.g., LC1-LC5). Based on the associations between logical channels and physical channels (as found in physical/logical channel tables 247), as well as the BCD creation rules/relationships (as found in BCD relationships 249), the BCD 400 may be established with vertexes 410 (and directed arcs 420) in step 520 accordingly. In addition, in step 525, should any logical channels be created or deleted after initial establishment of the BCD 400, the BCD may be maintained, i.e., reconfiguring the vertexes 410 (and arcs 420) of the established BCD to account for the addition or removal of one or more logical channels. The procedure 500 ends in step 530, with an established (and maintained) BCD 400.

Once the BCD 400 is established (e.g., and while maintained) in procedure 500 of FIG. 5, FIG. 6 illustrates an example procedure for configuring/assigning logical bandwidth allotment using the BCD 400. The procedure 600 starts in step 605, and continues to step 610, where logical channels are configured with a logical bandwidth allotment, such as by a network administrator or dynamically as described above (e.g., process 246). In step 615, the vertexes 410 of the BCD may be traversed to determine whether the constraints (i.e., bandwidth limitations) of the respective vertexes are met by the configured logical bandwidth allotments. For example, as mentioned above, each vertex may be traversed according to various DAG techniques, such as depth-first or breadth-first, typically starting at the base vertexes (e.g., V1, V2, and V5). If the constraints are met in step 620, the procedure 600 ends in step 625 with a determination that the logical bandwidth allotments are supported by the underlying physical channels. If, however, in step 620 one or more constraints are not met, the procedure 600 may return to step 610 where logical channels may be configured with a new logical bandwidth allotment, do determine whether the new logical bandwidth allotment meets the constraints of the BCD 400, accordingly. Further, should there be any change in logical bandwidth allotment (e.g., by an administrator and/or a dynamic change) in step 610, that is, a new change without having previous allotments that violated constraints in step 620, the established BCD 400 may be re-traversed in step 615 with the new logical bandwidth allotment values, that is, without having to reconfigure the BCD 400.

Advantageously, the novel techniques described herein determine whether logical bandwidth allotments are supported by underlying physical channels in a computer network. By establishing and traversing a BCD in the manner described above, the novel embodiments create efficient (and correct) techniques for confirming the initial configuration of logical channels, or more frequently, confirming adjustments to logical channel bandwidth (e.g., static and/or dynamic adjustments/confirmations). In particular, the techniques described above utilize a set of defined vertex relationships that allows the proper establishment of the BCD, important for both system configuration as well as admission control. Further, the dynamic aspects of one or more embodiments described herein (e.g., establishment and traversal of the BCD) alleviate the need for cumbersome and inefficient manual configuration.

While there have been shown and described illustrative embodiments that determine whether logical bandwidth allotments are supported by underlying physical channels in a computer network, it is to be understood that various other adaptations and modifications may be made within the spirit and scope of the present invention. For example, the embodiments have been shown and described herein with illustrative vertex relationships (i)-(vi). However, the embodiments of the invention in their broader sense are not so limited, and may, in fact, be used with other relationships that may be used to establish a BCD accordingly. Also, while the techniques described herein relate to down-stream logical channels (as will be appreciated by those skilled in the art), similar techniques may be used for upstream logical channels, e.g., in certain situations where applicable. Further, while the techniques described above refer to physical channels on physical cable connections, other communication media may be used in accordance with one or more embodiments described above. For example, a physical channel may represent a particular wireless frequency, or other distinct communication channel, accordingly.

The foregoing description has been directed to specific embodiments of this invention. It will be apparent, however, that other variations and modifications may be made to the described embodiments, with the attainment of some or all of their advantages. For instance, it is expressly contemplated that the components and/or elements described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method, comprising:
   determining, by a processor, whether configured logical bandwidth allotments for one or more logical channels are supported by maximum available physical bandwidths of one or more underlying physical channels assigned to those logical channels by:
   A) establishing a bandwidth-constraint directed acyclic graph (BCD) based on relationships between i) vertexes of the BCD that represent one of either logical channels or unions of logical channels or both, as well as one or more underlying physical channels of the logical channels of each vertex, and ii) the vertexes' maximum available bandwidth constraints; and
   B) traversing the vertexes of the BCD to determine whether the constraints of the vertexes are met.

2. The method as in claim 1, further comprising:
   configuring the relationships between vertexes of the BCD such that:
   i) each vertex represents one of either a logical channel or a union of a plurality of logical channels or both;
   ii) an out-neighbor of any vertex is a proper superset of that vertex, the proper superset having additional physical channels to those represented by the logical channels of that vertex;
   iii) an in-neighbor of any vertex is a proper subset of that vertex, the proper subset having fewer physical channels to those represented by the logical channels of that vertex;
   iv) if a first logical channel or union of logical channels intersects with a second logical channel or union of logical channels, a union of the first and second logical channels is represented as a vertex in the BCD;
   v) if a third logical channel or union of logical channels shares an identical set of physical channels with a fourth logical channel or union of logical channels, the third and fourth logical channels are represented as a single vertex in the BCD; and
   vi) each vertex represents a constraint that a sum of logical bandwidth allotments of logical channels of the vertex is less than or equal to a sum of maximum allowable physical bandwidths of physical channels of the logical channels of the vertex.

3. The method as in claim 2, wherein a first logical channel or union of logical channels intersects with a second logical channel or union of logical channels if the first logical channel or union of logical channels and the second logical channel or union of logical channels share at least one physical channel and do not share at least one other physical channel.

4. The method as in claim 1, further comprising:
   maintaining the relationships between vertexes of the BCD upon creation and deletion of logical channels.

5. The method as in claim 1, further comprising:
   assigning, to each of the logical channels, one or more physical channels, each physical channel having a maximum available physical bandwidth; and
   configuring each of the logical channels with a logical bandwidth allotment.

6. The method as in claim 5, wherein the logical bandwidth allotment is a minimum logical bandwidth allotment.

7. The method as in claim 6, wherein the minimum logical bandwidth allotment is based on a committed information rate (CIR) for the respective logical channel.

8. The method as in claim 5, wherein the logical bandwidth allotment is an actual usage of bandwidth on the logical channels.

9. The method as in claim 8, wherein the actual usage is based on load-balancing bandwidth between logical channels.

10. The method as in claim 1, wherein a physical channel is a transmission frequency on a communication medium.

11. The method as in claim 1,
    traversing the vertexes of the BCD from in-neighbors to out-neighbors.

12. The method as in claim 11, further comprising:
    traversing the vertexes of the BCD in one of either a depth-first manner or a breadth-first manner.

13. The method as in claim 1, further comprising:
    re-traversing the vertexes of the BCD in response to a change in logical bandwidth allotment for one or more logical channels.

14. Software encoded in one or more non-transitory computer-readable media and, when executed on a processor, operate to:
    determine whether configured logical bandwidth allotments for one or more logical channels are supported by maximum available physical bandwidths of one or more underlying physical channels assigned to those logical channels by:
    A) establishment of a bandwidth-constraint directed acyclic graph (BCD) based on relationships between i) vertexes of the BCD that represent one of either logical channels or unions of logical channels or both as well as one or more underlying physical channels of the logical channels of each vertex, and ii) vertexes' maximum available bandwidth constraints; and
    B) traversal of the vertexes of the BCD to determine whether the constraints of the vertexes are met.

15. The software as in claim 14, wherein the relationships between vertexes of the BCD comprise:
    i) each vertex represents one of either a logical channel or a union of a plurality of logical channels or both;
    ii) an out-neighbor of any vertex is a proper superset of that vertex, the proper superset having additional physical channels to those represented by the logical channels of that vertex;
    iii) an in-neighbor of any vertex is a proper subset of that vertex, the proper subset having fewer physical channels to those represented by the logical channels of that vertex;
    iv) if a first logical channel or union of logical channels intersects with a second logical channel or union of logical channels, a union of the first and second logical channels is represented as a vertex in the BCD;
    v) if a third logical channel or union of logical channels shares an identical set of physical channels with a fourth logical channel or union of logical channels, the third and fourth logical channels are represented as a single vertex in the BCD; and
    vi) each vertex represents a constraint that a sum of logical bandwidth allotments of logical channels of the vertex is less than or equal to a sum of maximum allowable physical bandwidths of physical channels of the logical channels of the vertex.

16. The software as in claim 14, when executed further operable to:
    maintain the relationships between vertexes of the BCD upon creation and deletion of logical channels.

17. The software as in claim 14, when executed further operable to:
    traverse the vertexes of the BCD from in-neighbors to out-neighbors.

18. The software as in claim 14, when executed further operable to:
re-traverse the vertexes of the BCD in response to a change in logical bandwidth allotment for one or more logical channels.

19. A method, comprising:
assigning, to each of one or more logical channels, one or more physical channels, each physical channel having a maximum available physical bandwidth;
configuring each of the logical channels with a logical bandwidth allotment; and
determining, by a processor, whether the configured logical bandwidth allotments are supported by the maximum available physical bandwidth of the assigned physical channels by:
A) establishing a bandwidth-constraint directed acyclic graph (BCD) comprising vertexes interconnected by directed arcs, each vertex having at least one of either an in-neighbor and an out-neighbor, the in-neighbor being a vertex from which a directed arc is received at the vertex and the out-neighbor being a vertex to which a directed arc is directed from the vertex, and wherein:
  i) each vertex represents one of either a logical channel or a union of a plurality of logical channels or both;
  ii) an out-neighbor of any vertex is a proper superset of that vertex, the proper superset having additional physical channels to those represented by the logical channels of that vertex;
  iii) an in-neighbor of any vertex is a proper subset of that vertex, the proper subset having fewer physical channels to those represented by the logical channels of that vertex;
  iv) if a first logical channel or union of logical channels intersects with a second logical channel or union of logical channels, a union of the first and second logical channels is represented as a vertex in the BCD;
  v) if a third logical channel or union of logical channels shares an identical set of physical channels with a fourth logical channel or union of logical channels, the third and fourth logical channels are represented as a single vertex in the BCD; and
  vi) each vertex represents a constraint that a sum of logical bandwidth allotments of logical channels of the vertex is less than or equal to a sum of maximum allowable physical bandwidths of physical channels of the logical channels of the vertex; and
B) traversing the vertexes of the BCD from in-neighbors to out-neighbors to determine whether the constraints of the vertexes are met.

20. The method as in claim 19, further comprising:
maintaining the relationships between vertexes of the BCD upon creation and deletion of logical channels.

21. An apparatus, comprising:
an input/output interface;
a processor; and
a memory that stores software processes executable by the processor, the software processes including
  a software process, that when executed, determines whether configured logical bandwidth allotments for one or more logical channels are supported by maximum available physical bandwidths of one or more underlying physical channels by
    establishment of a bandwidth-constraint directed acyclic graph (BCD) based on relationships between i) vertexes of the BCD that represent one of either logical channels or unions of logical channels or both, as well as one or more underlying physical channels of the logical channels of each vertex, and ii) the vertexes' maximum available bandwidth constraints, and
    determination that the constraints of the vertexes are met by traversal of the vertexes of the BCD.

22. The apparatus as in claim 21, wherein the software process, when executed, maintains relationships between vertexes of the BCD upon creation and deletion of logical channels.

23. The apparatus as in claim 21, wherein the software process, when executed, assigns to each of the logical channels one or more physical channels, each physical channel having a maximum available physical bandwidth, and configures each of the logical channels with a logical bandwidth allotment.

24. The apparatus as in claim 23, wherein the logical bandwidth allotment is a minimum logical bandwidth allotment.

25. The apparatus as in claim 21, wherein the software process, when executed, re-traverses the vertexes of the BCD in response to a change in logical bandwidth allotment for one or more logical channels.

* * * * *